United States Patent Office 3,116,270
Patented Dec. 31, 1963

3,116,270
PROCESS FOR PRODUCING THERMOSETTING POLYMER OF UNSATURATED ACID/ESTER INTERPOLYMER WITH ALKYLENE OXIDE
Charles J. Pennino, Monroeville, Pa., assignor to The B. F. Goodrich Company, New York, N.Y., a corporation of New York
No Drawing. Filed June 2, 1960, Ser. No. 33,395
6 Claims. (Cl. 260—86.1)

This invention relates to novel thermosetting polymeric compositions and more particularly pertains to alkylene oxide treated interpolymers of alpha,beta-olefinically unsaturated monocarboxylic acids and esters of alpha,beta-olefinically unsaturated monocarboxylic acids; to a novel method for preparing said interpolymers and to a method for curing films and the like, of said interpolymers.

Hydroxyalkyl esters of both saturated and unsaturated carboxylic acids have been prepared by the reaction of the carboxylic acids with an alkylene oxide as disclosed in U.S. Patent No. 2,819,296 and such unsaturated hydroxyalkyl esters have been copolymerized with non-acidic monomers as disclosed in U.S. Patent No. 2,681,-897. Carboxyl-containing polymers have been converted to polymers containing both carboxyl and hydroxyalkylene ester groups with alkylene oxides as described in U.S. Patents Nos. 2,530,983, 2,607,761 and 2,908,663.

The present invention is concerned with substantially non-cross-linked low molecular weight thermosetting polymers containing carboxyl, ester and hydroxy ester groups and to the method for preparing said polymers. The polymers embodied herein are of a critical low molecular weight range and contain carefully controlled levels of carboxyl and hydroxy alkyl groups which accounts for their unusual and unexpectedly good properties as thermosetting coating agents which can be cured to insoluble, strong, hard, flexible and clear films. The polymers embodied herein have the unusual and unexpected property of easily wetting, adhering tenaciously to and protecting metal surfaces. The compositions of this invention are particularly good for coating steel, aluminum and tin surfaces.

I have discovered a novel polymer comprising the reaction product of an alkylene oxide and an interpolymer of (1) from 25 to 75% by weight of at least one alpha, beta-olefinically unsaturated monocarboxylic acid and (2) from 75 to 25% by weight of at least one ester of an alpha,beta-olefinically unsaturated monocarboxylic acid copolymerizable with (1).

For the purposes of this invention the useful alkylene oxides are the compounds having the oxirane structure

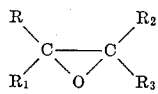

wherein R, $R_1$, $R_2$ and $R_3$ may be the same or different and each R group represents hydrogen and a hydrocarbon group having from 1 to 6 carbon atoms. Representative alkylene oxides include ethylene oxide, 1,2-propylene oxide, 1,2-butylene oxide, 2,3-butylene oxide, 1,2-isobutylene oxide, the pentylene oxides, the hexylene oxides, cyclohexene oxide, styrene oxide, epichlorohydrin, and the like and others. The most preferred are ethylene oxide, propylene oxide, the butylene oxides and mixtures of the same.

The alpha,beta-olefinically unsaturated monocarboxylic acids useful in this invention are preferably alpha,beta-monoolefinically unsaturated monocarboxylic acids having from 3 to 4 carbon atoms and having a terminal $CH_2=C<$ group such as acrylic acid and methacrylic acid.

The esters of alpha,beta-olefinically unsaturated monocarboxylic acids useful in this invention are preferably the lower alkyl esters of alpha,beta-monoolefinic terminally unsaturated carboxylic acids having from 4 to 10 carbon atoms such as methyl acrylate, ethyl acrylate, the propyl acrylates, the butyl acrylates, methyl methacrylate, ethyl methacrylate, the propyl methacrylates, the butyl methacrylates and the like. Most preferred are methyl methacrylate and ethyl acrylate.

The aforementioned interpolymers embodied herein are prepared by polymerizing the monomer mixture in an organic diluent with a free-radical initiator at a temperature of from about 50° C. to about 150° C. at sub-atmospheric, atmospheric or super-atmospheric pressures. The polymerization preferably is carried out in the absence of oxygen and other polymerization inhibitors.

Organic diluents which are most useful in the process of this invention are the aliphatic monohydric alcohols and preferred are aliphatic alcohols having from 1 to 6 carbon atoms such as methanol, ethanol, the propanols, the butanols, the amyl alcohols, the hexanols and cyclohexanol. Most preferred are the aliphatic monohydric alcohols having from 2 to 3 carbon atoms such as ethanol, n-propanol and iso-propanol.

Catalysts useful in the aforementioned polymerization process include free-radical polymerization initiators such as the peroxides, hydroperoxides, diacyl peroxides, peracids, azo compounds, the so-called redox catalyst systems, ultra violet, X-ray and nuclear radiation. Preferred as catalysts are acetyl peroxide, acetyl benzoyl peroxide, peracetic acid, hydroxy heptyl peroxide, isopropyl percarbonate, methyl ethyl ketone peroxide, cyclohexanone peroxide, cyclohexyl hydroperoxide, 2,4-dichlorobenzoyl peroxide, cumene hydroperoxide, dicumyl peroxide, t-butyl hydroperoxide, methyl amyl ketone peroxide, lauroyl peroxide, benzoyl peroxide, caprylyl peroxide, methyl cyclohexyl peroxide, t-butyl permaleic acid, t-butyl perbenzoate, di-t-butyl diperphthalate, t-butyl perphthalic acid, p-chloro benzoyl peroxide, t-butyl peracetate, di-t-butyl peroxide, dibenzal peroxide, and azobisisobutyronitrile and the like. Most preferred are caprylyl peroxide and benzoyl peroxide. The catalyst is most useful in the range of from about 0.5 to 5 parts per one hundred parts by weight of monomers.

The alkylene oxide treated products of this invention are prepared by the reaction of the aforementioned interpolymers with from about 0.8 to about 1 equivalents of alkylene oxide per equivalent of acid in the polymer at a temperature of from about 40 to 100° C. and more preferably from about 50 to 100° C. The products of the alkylene oxide treatment should contain a residual amount of from about 5–30% by weight of free acid. It is believed that some condensation of alkylene oxide occurs onto the hydroxy ester groups formed on the polymer chain during the reaction although the exact structure of the products is not known. The alkylene oxide treatment is conveniently carried out in the alcohol diluent used in the preparation of the starting polymer, although other organic diluents may be employed without departing from the scope of this invention. It is preferable, in order to reduce the reaction time to a practical period, to employ from about 0.1 to about 5% of a basic catalyst in the alkylene oxide reaction.

The basic catalysts useful in the alkylene oxide treatment of the acidic interpolymers include, but are not limited to, tertiary aliphatic amines such as trimethyl amine, triethyl amine, tripropyl amine, tributyl amine, N-methyl-N-ethyl propyl amine, N,N-dimethyl benzyl amine, and the like; tertiary heterocyclic amines such as pyridine, N-methyl piperidine, N,N'-dimethyl pyrazine, N-methyl pyrrolidine, quinoline, and the like and inorganic bases such as the alkalis, the alkaline earth oxides and hydroxides and the alkali and alkaline earth metal salts of carboxylic acids. Most preferred basic catalysts are the tertiary heterocyclic amines such as pyridine.

The alkylene oxide treated products embodied herein are often useful in aqueous solution for application as coating and impregnating materials. The alkylene oxide treated polymers may be precipitated from their alcohol solutions with water or other non-solvent for the polymer and upon removal of the alcohol by decantation or distillation the polymers can be dissolved in water at a pH of about 5 or above to form pourable solutions containing as much as 80% polymer solids. The pH of the solutions can be adjusted by the use of basic neutralizing agents such as ammonia, organic amines or alkali metal oxides, hydroxides, carbonates or bicarbonates. The aqueous pH is preferably adjusted by the addition of ammonia.

Pigments and fillers as well as coloring matter, etc., may be added to the aforementioned aqueous solutions.

The polymeric compositions embodied herein can be deposited from solution in the form of films and the like which can be cured at a temperature of from about 125 to 250° C. and preferably at a temperature of from about 150 to 175° C.

The polymeric compositions embodied herein are also useful thermoplastic materials which can be extruded at temperatures in the neighborhood of 70 to 80° C. and articles can be molded therefrom and subsequently cured at higher temperatures. The cured plastic articles have unusually good physical properties such as tensile, scratch hardness and solvent resistance.

In the following illustrative examples the quantities of ingredients are given in parts by weight unless otherwise specified.

EXAMPLE I

In a typical run (A) 100 parts of ethanol-water azeotrope (96% by volume) were refluxed in a reactor equipped with stirrer and a reflux column. To the stirred refluxing alcohol was added slowly over a 3 hour period a mixture of 65 parts acrylic acid, 35 parts ethyl acrylate and 1 part caprylyl peroxide. Upon completion of the addition of the monomer-catalyst mixture to the alcohol the resulting reaction mixture was refluxed for an additional two hours with continued stirring. Essentially 100% conversion of monomers to polymer was achieved in this time. The ethanolic solution of polymer (A) was analyzed with the following results.

Percent solids ------------------------------- 51.0
Percent acid in solids ----------------------- 60.4

It is apparent that the acrylic acid-ethyl acrylate copolymer prepared in the foregoing manner is composed of about 60% by weight of acrylic acid and 40% by weight of ethyl acrylate.

In a similar fashion a number of polymers listed in Table 1 were prepared. Polymers E, C, H, I, J and K were prepared with 2 parts caprylyl peroxide and polymer G was prepared with 4 parts caprylyl peroxide.

*Table 3*

REACTION OF BUTYLENE OXIDE WITH ACRYLIC ACID/ ETHYL ACRYLATE (60/40) IN ETHANOL

| Catalyst | Reaction temperature, °C. | Reaction time, hours | Percent solids | Percent acid in solids |
|---|---|---|---|---|
| 1 percent pyridine | 68 | 8 | 54.3 | 26.7 |
| 1 percent pyridine | 60 | 8 | 53.5 | 26.6 |
| Do | 75 | 6 | 56.8 | 17.8 |
| Do | 80 | 6 | 56.8 | 17.4 |
| 1 percent dimethylamine | 60 | 6 | 60.0 | 23.2 |
| 1 percent diethylamine | 60 | 6 | 59.1 | 25.5 |
| 1 percent triethylamine | 60 | 6 | 58.5 | 27.3 |
| 1 percent triethanolamine | 60 | 6 | 60.0 | 27.0 |
| 0.25 percent Conc. NH$_3$ | 60 | 6 | 48.4 | 35.3 |
| 0.5 percent Conc. NH$_3$ | 75 | 6 | 56.0 | 23.0 |

The molecular weight of these polymers varied from about 8,000 to about 20,000 as determined by conventional viscosity measurements.

EXAMPLE II

In a manner similar to that described above a copolymer from a charge of 60 parts acrylic acid and 40 parts ethyl acrylate was prepared in isopropanol. The resulting polymer solution contained 50% solids and the solid contained 58.8% acid. The molecular weight of this polymer was about 15,000 as determined by viscosity measurement.

EXAMPLE III

To the alcoholic solutions of polymer A of Example I was added a mixture of 49 parts of a butylene oxide containing 1,2-butylene oxide, cis-2,3-butylene oxide, trans-2,3-butylene oxide and 1,2-isobutylene oxide and 1 part of pyridine. The resulting mixture was stirred continuously and maintained at a temperature of about 75° C. for 6 hours under a reflux column. The butylene oxide treated polymer was analyzed with the following results:

Percent solids ----------------------------- 54.1
Percent acid in solids --------------------- 26.6

In a similar manner a number of the polymers given in Table 1 were treated with butylene oxide and the properties of the solutions are given in Table 2.

The results from the foregoing reaction on polymer A of Table 1 wherein the catalyst and temperature were varied are given in Table 3.

A portion of polymer A (400 g.) in Table 1 was precipitated from the ethanol solution by the addition of an excess of cold water. The precipitated polymer was suspended in water (49% total solids), about 1% pyridine was added to the slurry, 102 g. of butylene oxide were added to the slurry, the reaction was sealed and the mixture was maintained at 75° C. with agitation for 7 hours. The polymeric product was found to contain 24.3% acid.

*Table 1*

|  | A | B | C | D | E | F | G | H | I | J | K |
|---|---|---|---|---|---|---|---|---|---|---|---|
| Acrylic acid | 60 | 60 | 50 |  |  |  |  | 45 | 60 | 25 | 10 |
| Methacrylic acid |  |  |  | 65 | 50 | 50 | 45 |  |  |  |  |
| Ethyl acrylate | 40 | 40 | 50 | 35 | 50 | 50 | 30 | 30 |  | 75 | 90 |
| Methyl methacrylate |  |  |  |  |  |  | 25 | 25 | 40 |  |  |
| Percent solids | 51.0 | 45.3 | 49.8 | 46.3 | 46.0 | 49.7 | 47.9 | 50 | 48.2 | 51.1 | 49.9 |
| Percent acid in solids | 60.4 | 62.8 | 47.2 | 60.2 | 47.2 | 49.9 | 44.7 | 42.4 | 57.7 | 23.1 | 10.1 |

*Table 2*

|  | A′ | B′ | D′ | E′ | F′ | G′ | H′ | I′ | J′ | K′ |
|---|---|---|---|---|---|---|---|---|---|---|
| Percent solids | 54.1 | 57.7 | 52.3 | 50.9 | 53.7 | 52.8 | 54.4 | 51.1 | 49.4 | 49.1 |
| Percent acid in solids | 26.6 | 19.6 | 17.0 | 13.8 | 12.0 | 13.3 | 14.0 | 22.3 | 13.4 | 7.9 |

EXAMPLE IV

The polymer designated A' in Table 2 was precipitated from its ethanol solution with water and the wet, soft, viscous mass was then neutralized to a pH of about 5 with ammonium hydroxide. A 70% by weight solids solution of the neutralized polymer in water was pourable. The solids of the foregoing solution were varied by dilution with water and the Brookfield viscosities were determined at several polymer concentrations.

| Percent solids: | Brookfield viscosity, cps. |
|---|---|
| 66.4 | 31,400 |
| 58.3 | 12,000 |
| 50 | 4,720 |
| 40 | 1,000 |

A portion of this solution was cast into a uniform film on a flat sheet of polyethylene terephthalate by means of a calibrated draw bar. The film was dried at 80° C., removed from the Mylar and cured at 165° C. for 30 minutes. The tensile and elongation of the film were determined on the Instron machine. The cured film was found to have a tensile of 3,200 p.s.i and an elongation of about 10%. The scratch hardness of this film was excellent.

An aqueous solution of the ammonium salt of the above polymer (57.2% solids, pH 6) was used to wet tin panels (3" x 5", 30-30 gauge, bright dry finish, cake tin plate) which were then dried and cured at 165° C. for 30 minutes. The panels were then flexed 180° then 360° and returned to original position. In some cases a flex of 180° was made at right angles to the original flex. The flexed panels were then immersed in water followed by immersion in standard $CuSO_4 \cdot CHl$ solution consisting of 751.3 g. of $CuSO_4 \cdot 5H_2O$ and 192.2 cc. of conc. HCl diluted to one gallon with water for ten minutes. In no case was there any evidence of pitting or corrosion on the coated panels wherein a control uncoated panel was badly corroded by this treatment.

EXAMPLE V

The polymer solution designated A' in Table 2 was subjected to vaccum distillation until most of the ethanol was removed. n-Butanol was added to the solid polymer to give a 62.1% solids solution. Films cast from the foregoing solution were made of uniform thickness by pulling a calibrated bar across the solution immediately after casting. The resulting films were dried at 80° C. and were then cured at 165° C. Tensiles were determined on the Instron, "C" cell, 1½ inch jawspace, 1 inch crosshead, 10 inch chart, No. 16033 die and ½ inch bench marks. Tensiles were calculated as follows:

$$\text{Tensile} = \frac{4CL}{10t}$$

where $C$ = chart reading
$L$ = load in pounds
$t$ = sample thickness

A ten minute cure at 165° C. gave a film having a tensile of 2,500 p.s.i. and 15% elongation. A 30 minute cure at 165° C. gives a film having a tensile of 2,060 p.s.i. and an elongation of 10%.

The incorporation of plasticizers into the n-butanol solution described above prior to casting and curing the polymer films often improves film elongation and sometimes improves tensile. The use of 5% by weight of polyethylene glycol 400 monolaurate in the foregoing procedure produced a film which had a tensile of 2,690 p.s.i. and 10% elongation after 20 minutes cure at 165° C. The use of 5% polyethylene glycol 400 dilaurate gave a film having a tensile of 4,000 p.s.i and 10% elongation under the same sure conditions. The use of 10% diethylene glycol gave a rubbery film having a tensile of 1,600 p.s.i and an elongation of 60%. In a similar manner other polyhydric alcohols and esters can be incorporated to vary the physical properties of the polymer films embodied herein.

EXAMPLE VI

Ethanolic solutions of polymers D', E', F', G', J' and K' shown in Table 2 were used to prepare films on glass. The films were made of uniform thickness by drawing a 3 mil drawing bar across the solution after they were cast on clean glass plates. The films were dried at 80° C. and were then cured on the glass at 165° C. for 30 minutes. None of the films were sensitive to water after 5 days' immersion at room temperature.

These polymers were also found to be excellent adhesives for metal-to-metal surfaces as well as metal-to-plastic surfaces.

EXAMPLE VII

Polymer A of Example I was treated with ethylene oxide in the manner described in Example III. A solution containing 145.5 parts of the polymer A was treated with 75 parts of ethylene oxide and 1 part of pyridine in a sealed container at 60° C. for 6 hours. The resulting solution had a total solids of 61.5% and the solid contained 27.7% acid. This polymer was found to be soluble in water at pH 5 and above. An aqueous solution of the ammonium salt (pH 5.5) of this polymer was cast to form a film, the film was cured at 165° C. for 30 minutes and the resulting cured film was found to have a tensile of 2,700 p.s.i. and an elongation of about 15%.

EXAMPLE VIII

Polymer A of Example I was treated with propylene oxide in the manner described in Example III. A solution containing 840 parts of polymer A, 57 parts of propylene oxide and 1 part of pyridine was maintained at 60° C. in a closed container for 6 hours. The resulting solution contained 52.7% solids and the solid contained 17.5% acid. This polymer was found to be soluble in water at pH 5 and above. An aqueous solution of the ammonium salt of this polymer was used to deposit a film which was cured at 165° C. for 30 minutes to give a tensile of 2,200 p.s.i. and an elongation of about 35%.

I claim:
1. A process for producing a linear substantially non-cross-linked, low molecular weight, thermosetting polymer in alcoholic solution which comprises reacting constituents consisting of
   (a) an interpolymer consisting of from 25 to 75% by weight of at least one alpha,beta-monoolefinic terminally unsaturated carboxylic acid having from 3 to 4 carbon atoms and from 75 to 25% by weight of at least one ester of alpha,beta-monoolefinic terminally unsaturated monocarboxylic acid having from 4 to 10 carbon atoms and
   (b) from about 0.8 to about 1 equivalent per equivalent of the carboxylic acid of an alkylene oxide having the structure

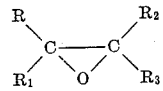

in which R, $R_1$, $R_2$ and $R_3$ are each selected from the group consisting of hydrogen and a hydrocarbon radical having from 1 to 6 carbon atoms, said reaction characterized by being carried out at a temperature of from about 40 to 100° C. in the presence of from about 0.1 to about 5% by weight of the reactants of a weakly basic catalyst, in an inert reaction medium consisting of an aliphatic monohydric alcohol having from 1 to 6 carbon atoms in which the reactants (a) and (b), and the polymer produced therefrom are soluble, and wherein the quantity of alcohol used is such that the resulting polymer solution contains from about 50 to about 60% dissolved polymer based on the total weight of the solution.

2. The process according to claim 1 wherein the interpolymer (a) contains at least one acid from the group consisting of acrylic acid and methacrylic acid and at least one ester from the group consisting of ethyl acrylate and methyl methacrylate.

3. The process of claim 2 wherein the alkylene oxide is ethylene oxide.

4. The process of claim 2 wherein the alkylene oxide is 1,2-propylene oxide.

5. The process of claim 2 wherein the alkylene oxide is 2,3-butylene oxide.

6. The process of claim 1 wherein the alcohol solvent is ethanol and the weakly basic catalyst is pyridine.

References Cited in the file of this patent

UNITED STATES PATENTS

| | | |
|---|---|---|
| 2,530,893 | Minter | Nov. 21, 1950 |
| 2,607,761 | Seymour | Aug. 19, 1952 |
| 2,842,519 | Ripley-Duggan | July 8, 1958 |
| 2,866,767 | Fang | Dec. 30, 1958 |

UNITED STATES PATENT OFFICE
CERTIFICATE OF CORRECTION

Patent No. 3,116,270                  December 31, 1963

Charles J. Pennino

It is hereby certified that error appears in the above numbered patent requiring correction and that the said Letters Patent should read as corrected below.

Column 5, line 33, for "$CuSO_4 \cdot CHl$" read -- $CuSO_4 \cdot HCl$ --; line 61, for "gives" read -- gave --; line 72, for "sure" read -- cure --; column 6, line 7, for "solution" read -- solutions --; line 43, after "linear" insert a comma; line 51, before "alpha" insert -- an --; column 8, line 7, for "2,530,893" read -- 2,530,983 --.

Signed and sealed this 9th day of June 1964.

(SEAL)
Attest:

ERNEST W. SWIDER
Attesting Officer

EDWARD J. BRENNER
Commissioner of Patents